(12) United States Patent
Keller et al.

(10) Patent No.: US 10,354,359 B2
(45) Date of Patent: Jul. 16, 2019

(54) VIDEO DISPLAY WITH PAN FUNCTION CONTROLLED BY VIEWING DIRECTION

(71) Applicant: THOMSON LICENSING, Issy les Moulineaux (FR)

(72) Inventors: Anton Werner Keller, Arni (CH); Roland Rene Bernold, Lucerne (CH)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/913,363

(22) PCT Filed: Aug. 21, 2013

(86) PCT No.: PCT/IB2013/001811
§ 371 (c)(1),
(2) Date: Feb. 20, 2016

(87) PCT Pub. No.: WO2015/025185
PCT Pub. Date: Feb. 26, 2015

(65) Prior Publication Data
US 2016/0203581 A1  Jul. 14, 2016

(51) Int. Cl.
*G06T 3/20* (2006.01)
*G06F 3/01* (2006.01)
*G06F 3/0485* (2013.01)

(52) U.S. Cl.
CPC ............... *G06T 3/20* (2013.01); *G06F 3/013* (2013.01); *G06F 3/0485* (2013.01)

(58) Field of Classification Search
CPC .............................. G06F 3/013; G06F 3/0485
See application file for complete search history.

(56) References Cited

U.S. PATENT DOCUMENTS

| 4,219,696 A | 8/1980 | Kogure et al. |
| 4,524,451 A | 6/1985 | Watanabe |

(Continued)

FOREIGN PATENT DOCUMENTS

| EP | 0816980 A2 | 1/1998 |
| KR | 20110035162 | 4/2011 |

(Continued)

OTHER PUBLICATIONS

Hansen et al., "Noise Tolerant Selection by Gaze-Controlled Pan and Zoom in 3D", ETRA '08 Proceedings of the 2008 Symposium on Eye Tracking Research & Applications, Mar. 26, 2008, pp. 205-212, Retrieved from Internet on Feb. 6, 2014.

(Continued)

*Primary Examiner* — James A Thompson
(74) *Attorney, Agent, or Firm* — Tuntunjian & Bitetto, P.C.

(57) ABSTRACT

A video processor is responsive to an output of a pair of cameras that are used for determining a viewer viewing direction of a display screen. As long as the viewer's viewing angular direction is directed toward a center region of a display screen, the pan function is disabled. When the viewer's viewing angle crosses a first threshold angular direction away from the screen center, dynamically tracking pan function is enabled so as to shift the displayed picture. When the viewer's viewing angle crosses an even larger, second threshold angular direction, the picture will shift in the same direction but at a faster rate. When the viewer's viewing angular direction decreases in a manner to cross a threshold angular direction that is smaller than the first threshold angular direction further picture shift is suspended. Thereby, a hysteresis feature is incorporated. When the viewer's viewing angular direction continues changing in the same direction that causes the suspension in the (Continued)

picture shift in a manner to cross a third threshold angular direction, that is adaptable to the accumulated picture shift, the picture shifts in the opposite direction.

9 Claims, 7 Drawing Sheets

(56) References Cited

U.S. PATENT DOCUMENTS

| | | | |
|---|---|---|---|
| 5,046,097 | A | 9/1991 | Lowe et al. |
| 5,742,264 | A | 4/1998 | Inagaki et al. |
| 5,742,687 | A | 4/1998 | Aarts |
| 5,987,141 | A | 11/1999 | Hoover |
| 6,084,556 | A | 7/2000 | Zwern |
| 6,211,912 | B1 * | 4/2001 | Shahraray ............... G11B 27/11 348/155 |
| 7,747,040 | B2 | 6/2010 | Toyama |
| 9,274,597 | B1 * | 3/2016 | Karakotsios .......... G06F 3/0346 |
| 2002/0105482 | A1 | 8/2002 | Lemelson et al. |
| 2005/0270367 | A1 | 12/2005 | McDowall et al. |
| 2009/0051699 | A1 * | 2/2009 | Posa ................. H04N 13/0278 345/619 |
| 2010/0007582 | A1 | 1/2010 | Zalewski |
| 2010/0103516 | A1 | 4/2010 | McKnight et al. |
| 2011/0115883 | A1 * | 5/2011 | Kellerman ............. G06F 3/012 348/46 |
| 2012/0060177 | A1 * | 3/2012 | Stinson, III ........ H04N 21/4223 725/12 |
| 2012/0162221 | A1 | 6/2012 | Porter et al. |
| 2012/0257035 | A1 | 10/2012 | Larsen |
| 2013/0113999 | A1 * | 5/2013 | Vashistha ............... H04N 5/147 348/702 |
| 2015/0015487 | A1 * | 1/2015 | Nakayama ............. G06F 3/012 345/156 |

FOREIGN PATENT DOCUMENTS

| | | |
|---|---|---|
| WO | WO2006055907 A1 | 5/2006 |
| WO | WO2007107949 A1 | 9/2007 |
| WO | 2012061148 | 5/2012 |
| WO | 2013006338 | 1/2013 |

OTHER PUBLICATIONS

Zhu et al., "Moving to the centre: a gaze-driven remote camera for teleoperation", Interacting with Computers, Elsevier vol. 23, No. 1, Butterworth-Geinemann, GB, Jan. 1, 2011, pp. 85-95.

Lankford, "Effective Eye-Gaze Input Into Windows", Proceedings from the Eye Tracking Research & Applications Symposium 2000 (ETRA), Palm Beach Gardens, FL, Nov. 6-8, 2000, ACM, NY, NY, pp. 23-27.

Toet, "Gaze directed displays as an enabling technology for attention aware systems", Computers in Human Behavior, Pergamon, NY, US, vol. 22, No. 4, Jul. 1, 2006, pp. 615-647.

Adams et al., "The Inspection of Very Large Images by Eye-gaze Control", AVI '08 Proceedings of the Working Conference on Advanced Visual Interfaces, May 28, 2008, pp. 111-118.

Zhu et al. "Eye and gaze tracking for interactive graphic display", Machine Vision and Applications, vol. 15, No. 3, Jun. 8, 2004, pp. 139-148.

Search Report dated Feb. 6, 2014.

Anuraag Agrawal et al., "Poster: Evaluation of an Approach for Remote Object Manipulation Utilizing Dynamic Magnifying Lenses", 2008 IEEE Symposium on 3D User Interfaces, Reno, NE, Mar. 2008.

William L. Chapin et al., "Virtual Environment Display for a 3D Audio Room Simulation", Proceedings vol. 1669, Stereoscopic Displays and Applications III; Jun. 1992.

John M. Chowning, "The Simulation of Moving Sound Sources", Department of Music and Artificial Intelligence Project, Stanford University, Stanford, CA, Jan. 1971.

Andrew Kiruluta et al., "Predictive Head Movement Tracking Using a Kalman Filter", IEEE Transactions on Systems, Man, and Cybernetics—Part B: Cybernetics, vol. 27, No. 2, Apr. 1997.

Myung-Suk Song et al., "Personal 3D Audio System With Loudspeakers", 2010 IEEE International Conference on Multimedia and Expo, Suntec City, Jul. 2010.

Paul M. Sharkey, Proceedings of the 1st European conference on disability, virtual reality and associated technologies (ECDVRAT Jul. 1996).

* cited by examiner

VIDEO DISPLAY WITH PAN FUNCTION CONTROLLED BY VIEWING DIRECTION

This application claims the benefit, under 35 U.S.C. § 365 of International Application PCT/IB2013/001811, filed Aug. 21, 2013, which was published in accordance with PCT Article 21(2) on Feb. 26, 2015 in English.

FIELD OF THE INVENTION

The invention relates to a video display apparatus controlled by a viewer viewing direction.

BACKGROUND OF THE INVENTION

"Pan & scan" (pan) is a term typically referred to cropping off horizontal sides of an original widescreen image having, for example, an aspect ratio of 2.35:1. Typically, pan may be used for fitting the most significant portion of the picture for display on, for example, a 16:9 aspect ratio display screen. The analogous cropping off in the vertical direction is typically referred to as "tilt & scan" (tilt). Zoom function may be used for better recognizing details. The zoom function may also be chosen for adapting pictures with different display ratio on the given screen from letterbox to different zoom modes. Different combinations of zoom, scan and tilt functions may be selected and controllable by a viewer using, for example, a conventional hand held remote-control unit.

FIG. 1a illustrates a picture 100 displayed on a display screen 106 without cropping and in a non-zoomed mode. In FIG. 1b, a zoom function is applied to picture 100 such that only a picture portion 105a of picture 100 is displayed on display screen 106. In FIG. 1b, portion 105a or picture 100 is zoomed center by having a center point 110 of display screen 106 at the same point as a center point 110' of picture 100. The zoom function results in a portion 105b of picture 100 being invisible for being outside the viewing area of screen 106. FIG. 1c illustrates picture portion 105a, displayed on display screen 106 that results from applying a combination of both a zoom function and a pan function. As a result, center points 110 and 110' do not coincide. Similar symbols and numerals in FIGS. 1a, 1b and 1c indicate similar items or functions.

When a viewer is watching a movie on display screen 106 of FIG. 1b, a particular object, not shown, may catch the viewer's attention. Such object may move in relation to screen 106 in a particular direction, for example, to the right of FIG. 1b. Consequently, the viewer might tend to follow the moving object by changing the viewer's head direction and/or the direction to which the viewer's eyes are directed to the right of FIG. 1b.

It may be desirable to employ a dynamically tracking pan function, a dynamically tracking tilt function or a combination thereof (each being referred herein as dynamically tracking pan/tilt function) responsive to the viewer head/eye movement. Such function may be used in order to maintain the moving object within visible portion 105a instead of being invisible.

In carrying out an inventive feature, as long as the viewer's viewing direction is directed toward a center region of a display screen, dynamically tracking pan/tilt function is not performed or is disabled. Once the viewer's viewing angle crosses a first threshold angular direction, away from the screen center and towards, for example, a right side border of the screen, dynamically tracking pan function is enabled so as to shift the displayed picture in the opposite direction. The result is that the aforementioned moving object is shifted closer to the center of the screen. Advantageously, that portion of the zoomed picture that has been heretofore invisible will, consequently, shift into the viewing area of the display screen. Therefore, the moving object will, advantageously, tend to remain closer to the screen center.

Assume that, after the pan function is initiated, the viewer's viewing angular direction begins changing in the opposite direction. This may result, for example, because the moving object has shifted by the aforementioned picture shift operation of the pan function. It may be desirable to avoid a picture bounce in the vicinity of the first threshold angular direction.

In carrying out a further inventive feature, the viewer's viewing angular direction is required to cross a threshold angular direction that is smaller than the first threshold angular direction in order to suspend or stop further pan function operation. Thereby, advantageously, a hysteresis feature is incorporated into the pan/tilt function.

In carrying out another inventive feature, when the viewer's viewing angular direction crosses an even larger, second threshold angular direction away from screen center and towards the same side border of the screen, the picture will pan at a faster rate than when the viewer's viewing angular direction is between the first and second threshold angular directions. The faster rate is applied, advantageously, to prevent the moving object from disappearing from the visible portion of the screen.

The hysteresis feature can also be incorporated with respect to crossing the second threshold angular direction. Similarly, incorporating multiple thresholds and corresponding hysteresis features are also possible.

Assume that, after the picture shifting has stopped, the viewer turns the head in an opposite direction to that previously triggering the pan function. When the viewer's viewing angular direction exceeds a third threshold angular direction, pan function in the opposite direction is initiated.

In carrying out an even additional inventive feature, the third threshold angular direction is adaptably determined by the extent of the accumulation of the picture shifting present at the time the picture shifting stopped. Advantageously, a hysteresis feature may also be incorporated with respect to crossing the third threshold angular direction.

A sudden fast rate of change of the eye movement, head-tracking or face orientation of the viewer might indicate a disturbance unrelated to the displayed picture. Therefore, in carrying out a further inventive feature, detection of such fast rate of change will have no effect on the pan/tilt function.

It may be desirable to complement the zoom or dynamically tracking pan/tilt function by making the perceived sources of sound such as speakers dynamically follow the dynamically tracking pan/tilt function. Advantageously, this is accomplished by adaptively mixing, for example, two stereo channels in response to control signals that control the pan/tilt function. Thus, as the displayed image shifts by the dynamically tracking pan/tilt function, the locations from which the sound is perceived to originate also track the display image to which the zoom or tracking pan/tilt function is applied. In short, the stereophonic width dynamically varies in accordance with the stereoscopic width.

An article entitled, THE SIMULATION OF MOVING SOUND SOURCES by John M. Chowning, (J. Audio Eng. Soc. 19, 2-6, 1971) describes an arrangement in which an illusory sound source can be moved through an illusory acoustical space. A number of independent audio channels is transformed into two or four channels where the location static or dynamic of each input channel can be independently controlled in an illusory environment. The method controls the distribution and amplitude of direct and reverberant signals between the loudspeakers.

U.S. Pat. No. 5,046,097, Lowe, et al., describes a process to produce the illusion of distinct sound sources distributed throughout the three-dimensional space containing the listener, using conventional stereo playback equipment.

U.S. Pat. No. 5,742,687 shows an embodiment for an audio-visual reproduction system in the form of, for example, a television set. In the case where a stereo audio signal is supplied, the position of the sound source that reproduces the left channel will present a virtual shift to the left. Similarly, the source representing the right channel signal will undergo a virtual shift to the right.

U.S. Pat. No. 4,219,696, Takuyo Kogure et al., discloses mathematics which would allow placement of sound image anywhere in the plane containing the two loudspeakers and the listener's head, using modified stereo replay equipment with two or four loudspeakers. The system relies on accurate characterization, matching, and electrical compensation of the complex acoustic frequency response between the signal driving the loudspeaker and the sound pressure at each ear of the listener U.S. Pat. No. 4,524,451, Koji Watanabe, explains a basis for the creation of "phantom sound sources" lateral to or behind the listener.

U.S. Pat. No. 5,987,141, Hoover, teaches a stereo expander in which stereophonic audio processing system having left and right stereophonic sound channels with respective loudspeakers therefor is presented. The system is provided with spatial expansion of the stereophonic sound so that a first pair of spaced-apart loudspeakers will acoustically appear to be spaced further apart than they actually are.

SUMMARY OF THE INVENTION

A video display apparatus includes a source of a video signal containing picture information of a picture to be displayed on a display screen and a sensor for sensing a viewing direction of a viewer with respect to the display screen. A processor is responsive to an output signal of the sensor and coupled to the display screen for applying a pan/tilt function to the displayed picture to shift the displayed picture with respect to the display screen.

In carrying out an inventive feature, the displayed picture is shifted when the viewing direction crosses, in a first direction, a first threshold direction. A change is produced in the picture shifting when the viewing direction crosses, in a direction opposite to the first direction, a second threshold direction in a manner to provide hysteresis.

In carrying out another inventive feature, the displayed picture is shifted at a first rate and in a first direction after the viewing direction crosses a first threshold direction. The displayed picture is further shifted in the same direction at a different, second rate, after the viewing direction crosses, in the first direction, a second threshold direction.

In carrying out a further inventive feature, the picture is shifted with respect to the display screen in a first direction when the viewing direction is within a first range of values. Additional picture shifting ceases when the viewing direction is within a second range of values. The picture is shifted in the opposite direction when the viewing direction crosses a first threshold direction. The first threshold direction is adaptively adjusted in accordance with a magnitude of the picture shift accumulated prior to a time when the additional picture shifting has ceased.

In carrying out an even further inventive feature, the processor is further responsive to content of the picture for varying the picture shift previously obtained in response to a change in the displayed picture content.

BRIEF DESCRIPTION OF THE DRAWINGS

The preferred embodiment of the present invention will be described below in more detail with reference to the accompanying drawings in which.

DETAILED DESCRIPTION

Figure 1A:
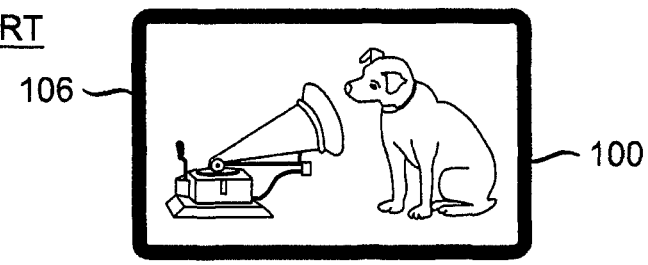
FIG. 1a illustrates in a front view a picture displayed on a display screen without cropping and in non-zoomed mode, in accordance with the prior art.
Figure 1B:
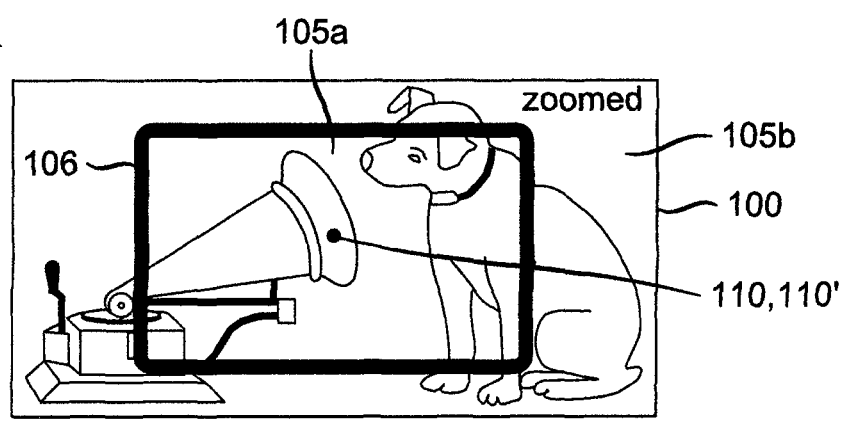
FIG. 1b illustrates in a front view a picture displayed on a display screen when a zoom function is applied to the picture, in accordance with the prior art.
Figure 1C:
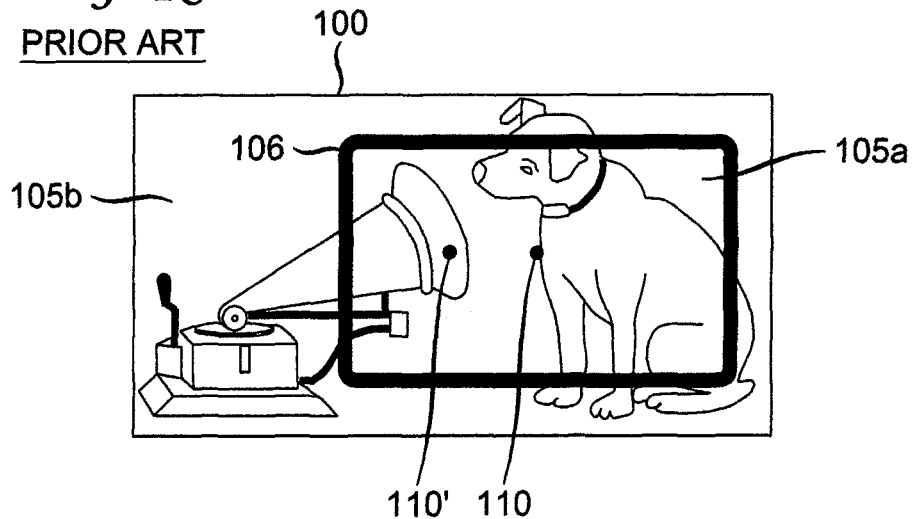
FIG. 1c illustrates in a front view a picture portion displayed on the display screen when both a zoom function and a pan function are applied, in accordance with the prior art.
Figure 2:
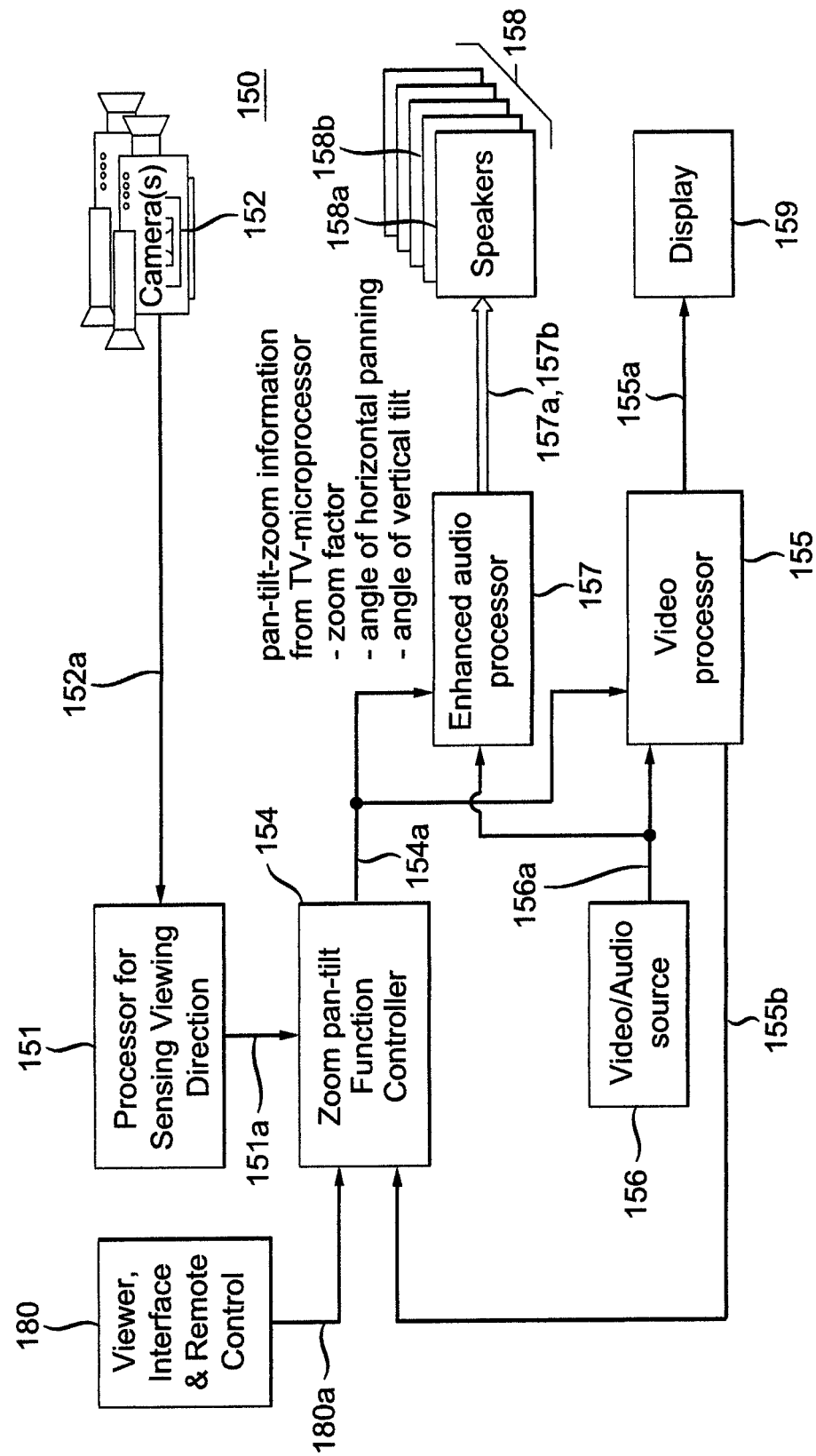
FIG. 2 illustrates a block diagram of a system, embodying an inventive feature.

FIG. 2 illustrates a block diagram of a system 150, embodying an inventive feature. Similar symbols and numerals in FIGS. 1a, 1b, 1c and 2 indicate similar items or functions.

System 150 of FIG. 2 includes an input video/audio source 156 that applies a video containing portion of an input video/audio signal 156a to a video processor 155 and an audio containing portion of input video/audio signal 156a to an enhanced audio processor 157. Video processor 155 derives picture information and enhanced audio processor 157 derives audio information from the corresponding portions of video/audio signal 156a in a conventional manner.

A zoom, pan/tilt function controller 154 is responsive to a signal 180a produced in a conventional way in a viewer interface and remote control 180. Controller 154 generates a signal 154a that is applied to video processor 155. Video processor 155 applies in a conventional manner a conventional zoom or pan/tilt function in a conventional video display 159 in accordance with viewer's initiated commands via interface and remote control 180. Video processor 155 generates an output video signal 155a for driving video display 159.

Figure 3A:
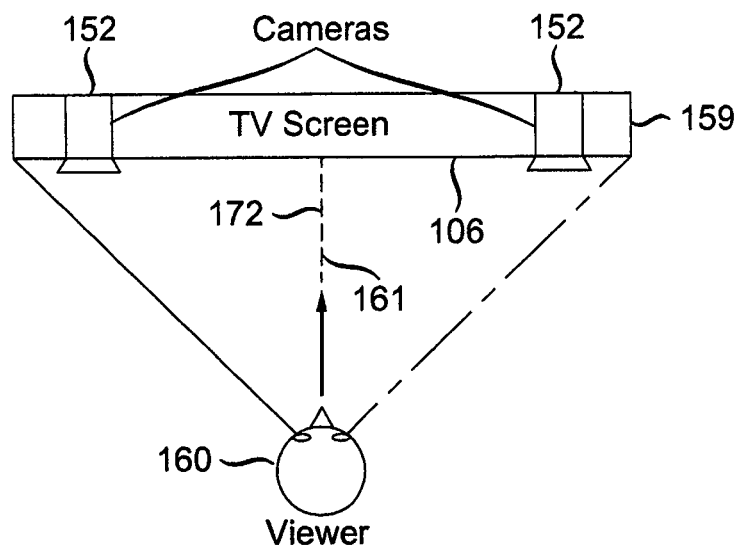
FIGS. 3a and 3b illustrate, each, a pair of cameras for sensing viewer viewing direction and for controlling the arrangement of FIG. 2.
Figure 3B:
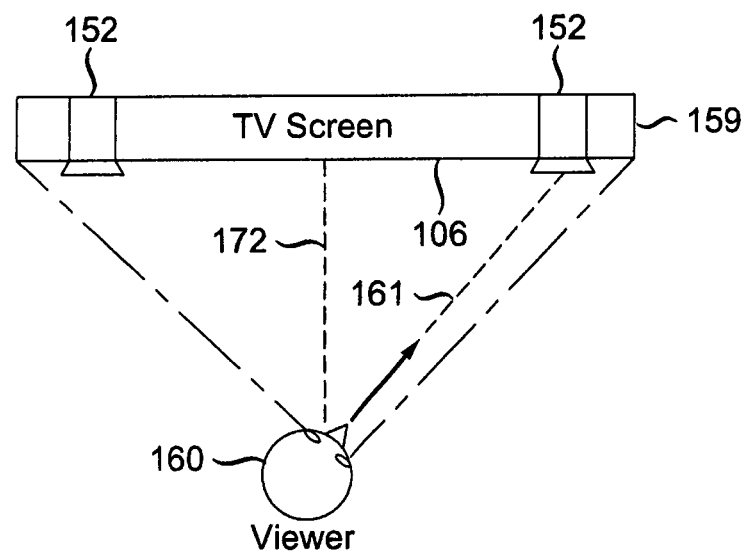

Each of FIGS. 3a and 3b illustrates schematically a top view of a pair of cameras 152 of system 150 of FIG. 2 mounted in the vicinity of the left and right sides, respectively, of display screen 106 of FIGS. 3a and 3b. Similar symbols and numerals in FIGS. 1a-1c, 2, 3a and 3b indicate similar items or functions. Cameras 152 of FIGS. 3a and 3b provide together, stereoscopic picture information that enables a conventional processor for sensing viewing direction 151 to sense viewing direction 161 of a viewer 160. In the example of FIG. 3a, viewing angular direction 161 is perpendicular to display screen 106 of video display 159. On the other hand, viewing angular direction 161 in the example of FIG. 3b is directed to the extreme right side of display screen 106.

Cameras 152 of FIG. 2 generate a pair of output signals 152a are applied to processor for sensing viewing direction 151 for sensing at least one of face, head or eyes position of viewer 160 of FIGS. 3a and 3b with respect to display screen 106. A single stereoscopic camera can be used instead of the pair of cameras 152. Also, a non-stereoscopic single camera with enhanced processing of face or eye movement detection can be used instead of pair cameras 152. Processor for sensing viewing direction 151 of FIG. 2 generates in a conventional manner an output signal 151a that is indicative of a present viewing direction of viewer 160 of FIGS. 3a and 3b.

In carrying out an inventive feature, zoom, pan/tilt function controller 154 of FIG. 2 is responsive to output signal 151a for generating control signal 154a. Control signal 154a produced in controller 154 is applied to video processor 155 in a manner to produce dynamically tracking pan/tilt function.

Figure 4A:
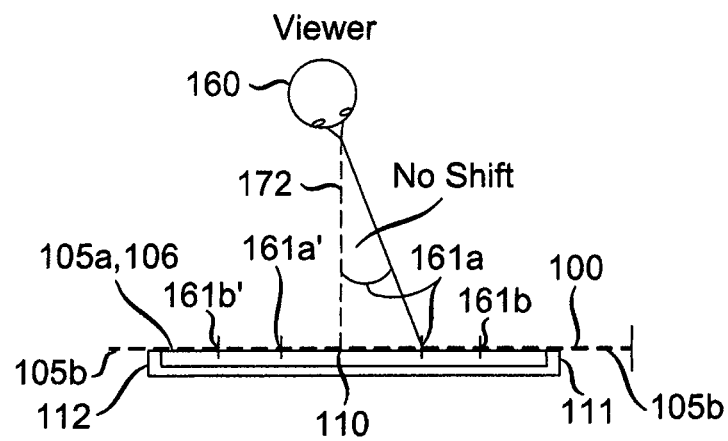
FIGS. 4a, 4b, 4c and 4d illustrate, each, a top view of a display screen viewed by a viewer, for explaining the operation of the system of FIG. 2.
Figure 4B:
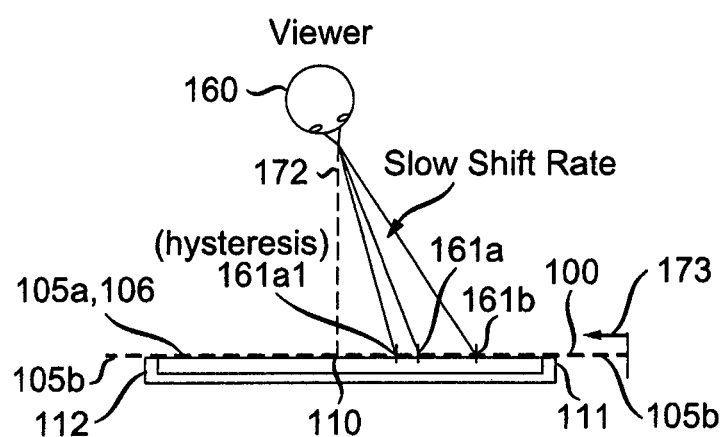
Figure 4C:
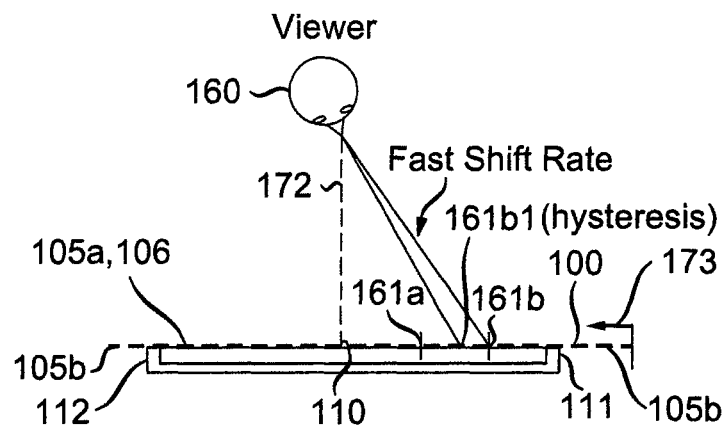
Figure 4D:
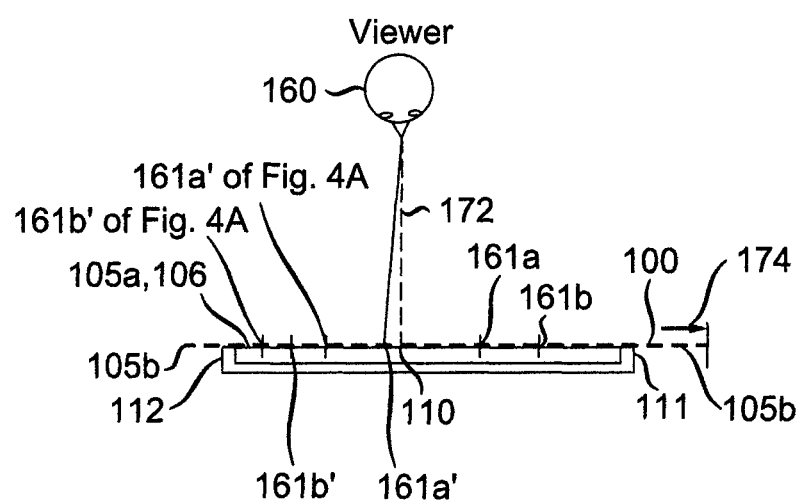
Figure 5A:
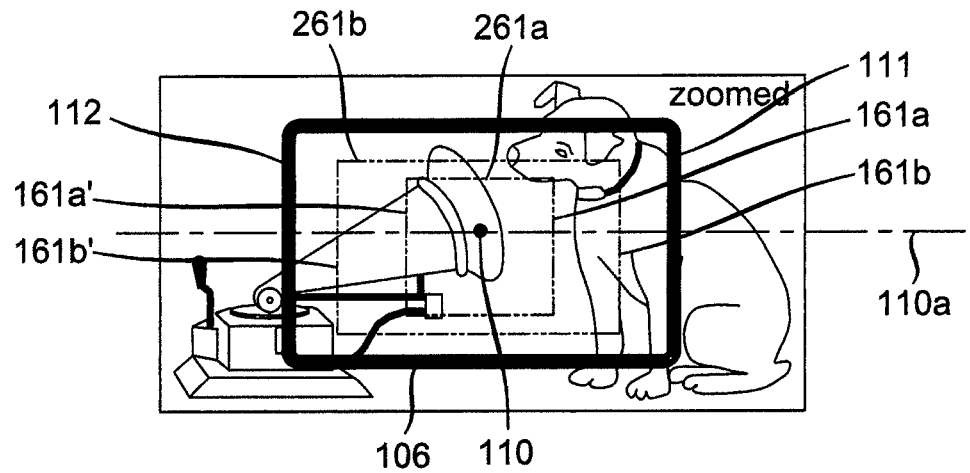
FIGS. 5a and 5b illustrate, each, a front view of display screen for explaining the operation of the system of FIG. 2.
Figure 5B:
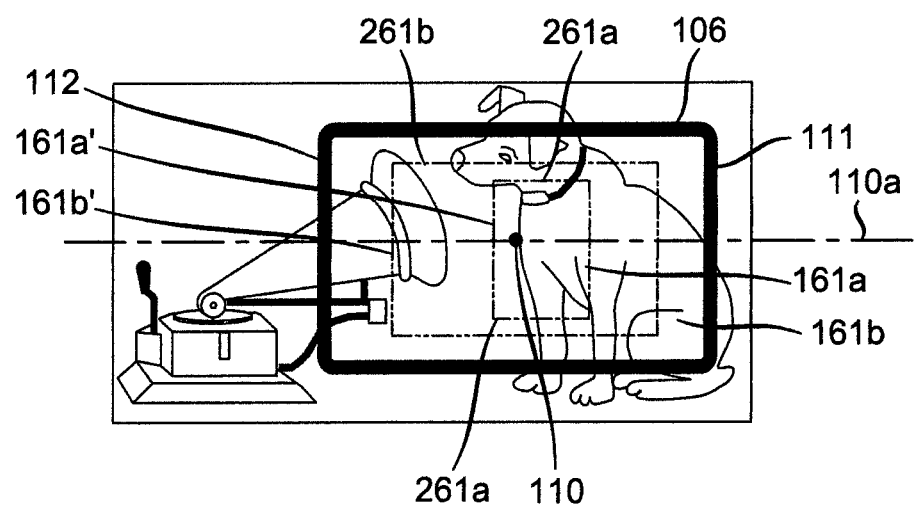

FIGS. 5a and 5b are similar to FIGS. 1b and 1c, respectively, except as explained later on. Each of FIGS. 5a and 5b shows a horizontal line 110a extending through screen center 110 for explanation purposes. FIGS. 4a, 4b, 4c and 4d collectively depict a direction 161a1, a direction 161a, a direction 161b1, a direction 161b, a direction 161a' and a direction 161b'. Each of directions 161a1, 161a, 161b1, 161b, 161a' and 161b' intersects, for example, in a spot 161a1, a spot 161a, a spot 161b1, a spot 161b, a spot 161a' and a spot 161b', respectively, disposed in a horizontal direction along, for example, horizontal line 110a of FIGS. 5a and 5b. In FIGS. 5a and 5b, intersection spots 161a1 and 161b1 have been omitted. Similar symbols and numerals in FIGS. 1a-1c, 2, 3a, 3b, 4a-4d, 5a and 5b indicate similar items or functions.

In FIG. 4a, picture 100 is initially zoomed center in a way similar to that explained with respect to FIG. 1b or 5a. Assume that, when picture 100 is initially zoomed center, as in FIG. 4a, an object, not shown, that is displayed in display screen 106 in visible portion 105a of FIG. 5a, moves in a horizontal direction parallel to horizontal line 110a towards a side edge 111 of screen 106 that is at the right of each of FIGS. 4a, 4b, 4c and 4d. Also assume that, when picture 100 is zoomed center, viewer 160 turns the head or eyes to the right side of FIG. 4a that is the left side with respect to viewer 160, for the purpose of, for example, following the moving object.

As long as a viewing angular direction of viewer 160 is within an angular range that is smaller than threshold angular direction 161a, dynamically tracking pan function is not applied or is disabled. When viewer 160 viewing angular direction crosses threshold angular direction 161a of FIG. 4b or, in other words, when a difference between viewer 160 viewing angular direction and threshold angular direction 161a changes polarity, dynamic tracking pan function is applied so as to shift picture 100 gradually to the left of FIG. 4b at a slow first rate.

In carrying out an inventive feature, after crossing threshold angular direction 161a and as long as viewer 160 viewing angular direction remains at an angular direction that is larger than a hysteresis providing threshold angular direction 161a1, dynamically tracking pan function is further applied so that picture 100 additionally shifts to the right with respect to viewer 160 that is to the left of FIG. 4b, as indicated by the direction of an arrow 173. Threshold angular direction 161a1 is slightly smaller than angle 161a for providing hysteresis that, advantageously, prevents picture back and forth bouncing.

In carrying out an additional inventive feature, when viewer 160 viewing angular direction becomes larger than a threshold angular direction 161b of FIG. 4c or, in other words, when a difference between viewer 160 viewing angular direction and threshold angular direction 161b changes polarity, additional shifting continues but, advantageously, at a faster rate than in the range between angular directions 161a1 and 161b. Similarly to the threshold feature discussed before, after crossing threshold 161b shifting picture 100 will progress at the relatively faster rate, as long as viewer 160 maintains a viewing angular direction that is larger than a threshold angular direction 161b1. Threshold angular direction 161b1 is slightly smaller than threshold angular direction 161b in a manner to provide hysteresis. Should viewer 160 viewing angle become smaller than hysteresis providing threshold angular direction 161b1 but larger than threshold angular 161a1 of FIG. 4b, additional shifting of picture 100 would revert to the slower rate that existed immediately prior to crossing threshold angular direction 161b of FIG. 4c. When the viewing angular direction of viewer 160 becomes smaller than threshold angular direction 161a1 of FIG. 4b, additional shifting of picture 100 ceases and shifting picture 100 is held in suspense in the same shifted or pan state accumulated immediately prior to crossing threshold angular direction 161a1.

As a result of, for example, the previously discussed shift of picture 100 to the left of FIG. 4c, viewer 160 is likely to turn the head in the opposite direction that is to the right of viewer 160, as shown in FIG. 4d. Threshold angular direction 161a' extends from perpendicular direction line 172 towards the left side of line 172. As long the viewing angular direction of as viewer 160 is within an angular range that is smaller than threshold angular direction 161a', any change in shifting of picture 100 remains suspended, as explained before. On the other hand, should viewer 160 viewing angular direction exceed or cross threshold angular direction 161a', dynamically tracking pan function would apply in the opposite direction for shifting picture 100 to the right of FIG. 4d that is to the left with respect to viewer 160 or towards center 110 of display screen 106, as shown by an arrow 174. Except as further explained, the aforementioned features associated with, for example, angular directions 161a, and 161b are similarly applicable to angular directions 161a' and 161b', respectively, that are located at the left side of perpendicular direction line 172.

In carrying out an inventive feature, the magnitude of, for example, each of threshold angular directions 161a' and 161b' of FIG. 4d varies adaptably in accordance with the amount of pre-existing shifting of picture 100 that has accumulated until the additional shifting of picture 100 to the left side of FIG. 4c has been accumulated and held in suspense.

It should be understood that the features that are described later on with respect to FIGS. 4a-4d, are symmetrically applicable to a symmetrical situation in which the object, not shown, displayed in display screen 106 in portion 105a of FIG. 5a, moves along horizontal line 110a, instead, towards a side edge 112 of screen 106 that is at the left of each of FIGS. 4a, 4b, 4c and 4d when picture 100 is zoomed center. For example, in FIG. 4a, angular directions 161a' and 161b' are equal to angular directions 161a and 161b, respectively.

On the other hand, advantageously, the magnitude of each of threshold angular directions 161a' and 161b' of FIG. 4d, that is applicable to the situation, described before with respect to FIG. 4d, in which pre-existing shifting of picture 100 is present, the magnitude of each of angular directions 161a' and 161b' is smaller than in FIG. 4a, respectively. This feature, advantageously, facilitates a quick return to the non-shifted, zoomed center of picture 100 of FIG. 4a.

Dynamically tracking tilt function is performed in an analogous way to dynamically tracking pan function. In implementing the dynamically tracking pan function, picture shift occurs in the horizontal direction, as explained before; whereas in implementing the dynamically tracking tilt function, picture shift occurs in the vertical direction. Also, it should be understood that, instead of having pan/tilt function that changes at discrete threshold angular directions, changes in the pan/tilt function can occur in a non-discrete continuous manner angular directions.

Each of FIGS. 5a and 5b depicts a perimeter 261a and a perimeter 261b. Perimeter 261a includes threshold angular directions 161a and 161a' in the horizontal direction of horizontal line 110a. Similarly, perimeter 261b includes threshold angular directions 161b and 161b'. A corresponding portion of each of perimeter 261a and 261b also includes threshold angular directions that are associated with initiating shifting of picture 100 in the vertical direction to provide dynamically tracking tilt function.

In FIG. 5a, picture 100 is zoomed centered. Therefore, perimeters 261a and 261b are symmetrical in the horizontal direction with respect to center 110. On the other hand, in FIG. 5b, picture 100 is already pre-shifted. Therefore, perimeters 261a and 261b are asymmetrical in the horizontal direction with respect to center 110 in a manner to provide adaptable dynamically tracking pan function, as explained before.

Assume that when picture 100 is shifted such as in, for example, in FIG. 5b, the scene depicted in picture 100 abruptly changed so that the aforementioned moving object is no longer relevant to viewer 160 of FIG. 3a or 3b. Advantageously, video processor 155 of FIG. 2 includes a detector, not shown, responsive to video/audio signal 156a for detecting the occurrence of the scene change to generate a reset signal 155b that is coupled to zoom, pan/tilt function controller 154 for overriding the accumulated shifting of picture 100 of FIG. 5b in a manner to center picture 100 as in FIG. 5a. This feature, advantageously, facilitates a quick return to the non-shifted centered picture 100 of FIG. 4a upon the occurrence of a scene change.

Figure 6:
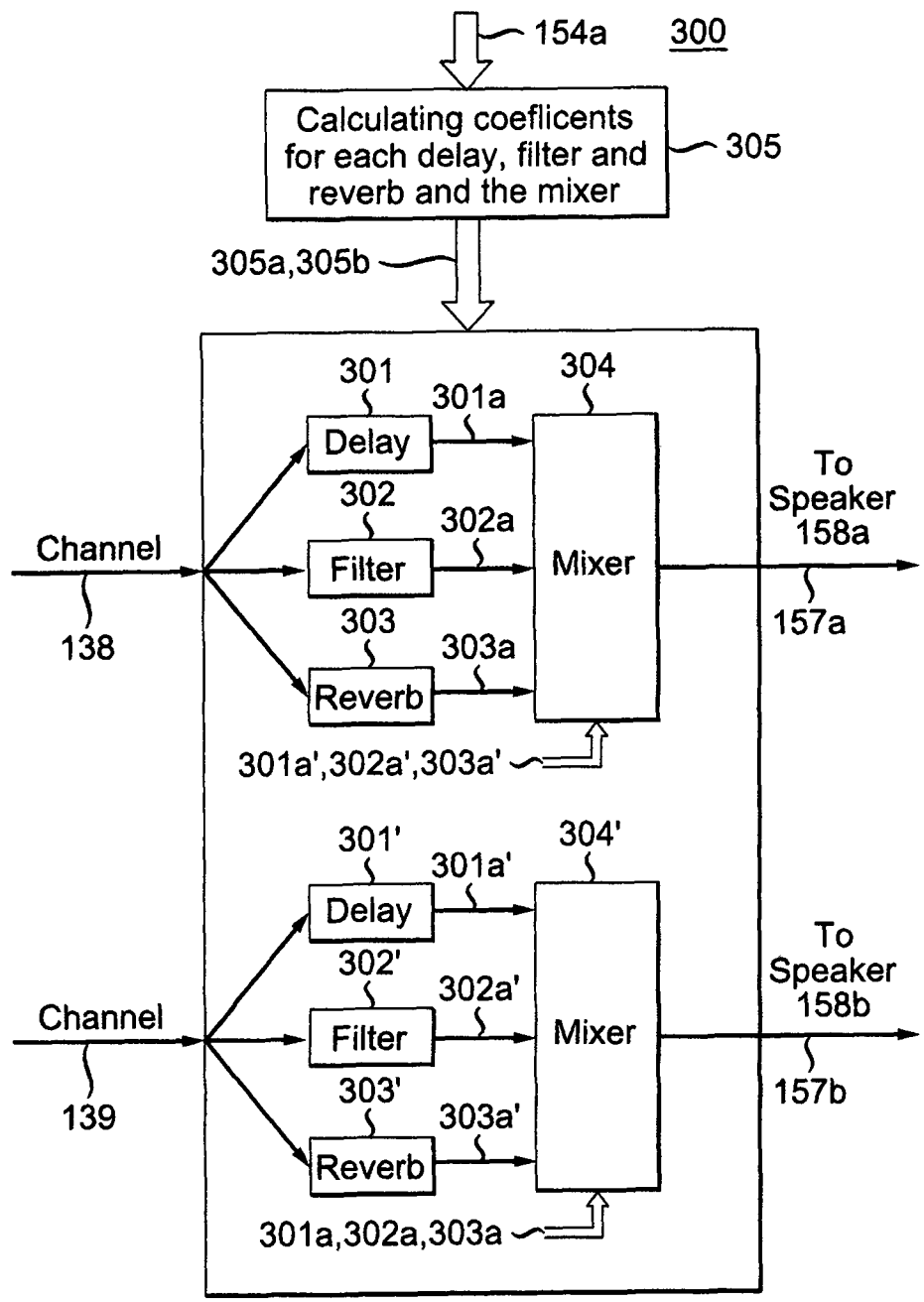
FIG. 6 illustrates a block diagram of a portion of an audio processor of FIG. 2 that performs a virtual audio shift of a pair of stereo audio channels in response to an output of the cameras of FIGS. 3a and 3b.

FIG. 6 depicts a console 300 that is included in audio processor 157 of FIG. 2. Similar symbols and numerals in FIGS. 1a-1c, 2, 3a, 3b, 4a-4d, 5a, 5b and 6 indicate similar items or functions. Console 300 of FIG. 6 receives a pair of stereo audio channels, 138 and 139. Channels 138 and 139 are derived in a conventional manner, not shown, in audio processor 157 from video/audio signal 156a of FIG. 2.

Channel 138 of FIG. 6 is applied through three parallel signal paths to an audio mixer 304. It is delayed in a delay 301 to produce a delayed signal 301a; it is filtered in a filter 302 to produce a filtered signal 302a and it is reverbed in a reverb stage 303 to produce a reverbed signal 303a. Similarly, channel 139 is applied through three parallel signal paths to an audio mixer 304'. It is delayed in a delay 301' to produce a delayed signal 301a'; it is filtered in a filter 302' to produce a filtered signal 302a' and it is reverbed in a reverb stage 303' to produce a reverbed signal 303a'. Mixer 304 combines signals 301a, 302a, 303a, 301a', 302a' and 303a' to generate output signal 157a for driving speaker 158a. Mixer 304' also combines signals 301a, 302a, 303a, 301a', 302a' and 303a' to generate output signal 157b for driving speaker 158b. As explained before, it is well known to process a pair of stereo signals such as channels 138 and 139 in such a way that the sound produced by speakers such as 158a and 158b appears to a viewer/listener as being originated in locations, shifted relative to where the actual speakers are physically located.

Advantageously, output signal 154a that controls zoom, pan/tilt function, as explained before, is also applied to a programmable logic array (PLA) 305 for producing a set of coefficients 305a that are collectively applied to delay 301, filter 302, reverb stage 303 and mixer 304. PLA 305 also produces, a second set of coefficients 305b that are collectively applied to delay 301', filter 302', reverb stage 303' and mixer 304'. Advantageously, in the arrangement of FIG. 6, coefficients 305a and 305b change dynamically in accordance with signal 154a to produce dynamic virtual shift of the sound sources. For obtaining a corresponding virtual sound source shift, coefficients 305a and 305b dynamically vary in accordance with the present shift of picture 100 of FIGS. 4a-4d.

Advantageously, signals 157a and 157b of FIGS. 2 and 6 generated by enhanced audio processor 157 drive loudspeakers 158a and 158b, respectively, in a manner to make viewer 160 of FIGS. 4a-4d perceive the sound produced in loudspeakers 158a and 158b of FIG. 2 as dynamically changing in accordance with the dynamically tracking pan/tilt function. It should be understood that this arrangement is not limited to a pair of speakers but may include systems like the surround sound speakers or the like.

Thus, as the displayed image shifts by the dynamically tracking pan/tilt function, the locations from which the sound sources are perceived to originate also follow the shifted or zoomed displayed image to form virtual shift of the sound. Coefficients 305a and 305b of FIG. 6 that are required for each selected virtual shift of loudspeakers 157 and 158 can be programmed prior to installation or use by computation according to the teaching of the prior art and/or by experimentation that might consider the size of a room containing loudspeakers 157 and 158. As signal 154a change, the selection of coefficients 305a and 305b of FIG. 5 change in a dynamic manner.

The invention claimed is:
1. A video display apparatus, comprising:
a source of a video signal containing picture information of a picture to be displayed on a display screen, said video signal comprising a succession of scenes;
an interface for receiving a signal indicative of a viewing angular direction of a viewer with respect to said display screen;
a video processor configured to detect when a scene change occurs in said video signal; and
a processor responsive to an output signal of said signal indicative of a viewing direction and coupled to said display screen and configured to display a zoomed part of the picture, said zoomed part of the picture being shifted according to a pan/tilt function applied with respect to said viewing angular direction according to said display screen, said pan/tilt function being applied when said viewing angular direction crosses, in a first direction, a first threshold angular direction and for continuing said picture shifting until said viewing angular direction crosses, in a direction opposite to said first direction, a second threshold angular direction that is at an angle smaller than an angle of the first threshold angular direction in a manner to provide hysteresis, wherein the pan-tilt function is reset to center the zoomed part of the picture when a scene change is detected by the video processor.

2. The apparatus according to claim 1, wherein, prior to said viewing angular direction crossing said first threshold angular direction, said picture shifting is disabled.

3. The apparatus according to claim 1, wherein after crossing said second threshold angular direction and as long as said viewing angular direction is within a range of values, additional accumulation of picture shifting is disabled.

4. The video display apparatus according to claim 1, further comprising a sensor for generating said signal indicative of said viewing angular direction.

5. A video display apparatus, comprising:
a source of a video signal containing picture information of a picture to be displayed on a display screen, said video signal comprising a succession of scenes;
an interface for receiving a signal indicative of a viewing angular direction of a viewer with respect to said display screen;
a video processor configured to detect when a scene change occurs in said video signal; and
a processor responsive to an output signal of said signal indicative of a viewing direction and coupled to said display screen for configured to display a zoomed part of the picture, said zoomed part of the picture being shifted according to a pan/tilt function applied with respect to said display screen in a first direction and said viewing angular direction, said pan/tilt function being applied when said viewing angular direction is within a first range of values, for ceasing additional picture shifting when said viewing angular direction is within a second range of values and for shifting said picture in the opposite direction when said viewing angular direction crosses a first threshold angular direction, said first threshold angular direction being adaptively adjusted in accordance with a magnitude of the picture shift accumulated prior to a time when the additional picture shifting has ceased, wherein the pan-tilt function is reset to center the zoomed part of the picture when a scene change is detected by the video processor.

6. The video display apparatus according to claim 5, further comprising a sensor for generating said signal indicative of said viewing angular direction.

7. A video display apparatus, comprising:
a source of a video signal containing picture information of a picture to be displayed on a display screen, said video signal conventionally comprising a succession of scenes;
an interface for receiving a signal indicative of a viewing angular direction of a viewer with respect to said display screen;
a video processor configured to detect when a scene change occurs in said video signal; and
a processor responsive to an output signal of said signal indicative of a viewing direction and coupled to said display screen and configured to display a zoomed part of the picture, said zoomed part of the picture being shifted according to a pan/tilt function applied with respect to said viewing angular direction, said pan/tilt function being applied at a first rate in a first direction after said viewing angular direction crosses a first threshold direction and at a different, second rate, after said viewing direction crosses in said first direction a second threshold angular direction, wherein said pan/tilt function is reset to center the zoomed part of the picture when a scene change is detected.

8. The video display apparatus according to claim 7, wherein said second threshold angular direction corresponds to a viewing angular direction that is closer to an edge of said display screen than said viewing angular direction that corresponds to said first threshold angular direction, and wherein said second rate is faster than said first rate.

9. The video display apparatus according to claim 7, further comprising a sensor for generating said signal indicative of said viewing angular direction.

* * * * *